United States Patent Office 3,424,778
Patented Jan. 28, 1969

1

3,424,778
ORGANOSILANES HAVING TRIALKYL-
SILYLPHENYL GROUPS
Tse C. Wu, Waterford, N.Y., assignor to General Electric
Company, a corporation of New York
No Drawing. Filed Nov. 21, 1966, Ser. No. 595,625
U.S. Cl. 260—448.2           5 Claims
Int. Cl. C07f 7/12; C08g 31/22

This application relates to organosilanes having trialkylsilylphenyl substituents. More particularly, this application relates to such silanes having the formula:

(1) $\qquad R_xSiR'_yX_{4-(x+y)}$ where R is a trialkylsilylphenyl group having a formula selected from the class consisting of:

(2) 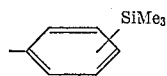

(3) 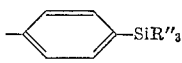

and (4) 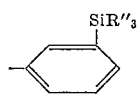

where Me is methyl, R'' is a lower alkyl radical selected from the class consisting of methyl, ethyl, and propyl, not more than two R'' groups being methyl in any given trialkylsilylphenyl group; R' is a monovalent aryl group, X is a reactive group, $x$ is an integral number of from 1 to 3, $y$ is an integral number of from 0 to 2, and the sum of $x$ and $y$ is from 1 to 3.

Aryl-substituted organopolysiloxanes are known to have greater high temperature stability and radiation resistance than the corresponding alkyl-substituted organopolysiloxanes. However, phenyl-substituted organopolysiloxanes, while having the high temperature and radiation resistance properties ascribed to aryl-substituted organopolysiloxanes, are generally brittle. Chiefly, this brittleness is due to the symmetry of the phenyl substitution. If the symmetry is broken by the inclusion of other substituents, the compound becomes more flexible. However, if this other substituent is alkyl, then the full effect of the high temperature and radiation resistance properties of the phenyl-substituted compound is not realized. If the symmetry is broken by the inclusion of another aryl substituent, not only is the compound less brittle, but additionally, the high temperature and radiation resistance properties can be fully utilized.

An invaluable starting material for forming organopolysiloxanes is an organosilane having reactive substituents. Thus, it is an object of this invention to provide an organosilane substituted with trialkylsilylphenyl groups which is copolymerizable into organosiloxane polymers substituted with such groups, due to the presence of reactive substituents.

As previously mentioned, the organosilanes of the present invention as described by Formula 1 can be substituted with, in addition to the trialkylsilylphenyl groups, various aromatic substituents, R'. Among the aryl groups which R' represents are phenyl, paraphenoxyphenyl, tolyl, xylyl, ethylphenyl, naphthyl, biphenyl, etc. The X substituent is a reactive substituent and is selected from the class consisting of bromide, chlorine, hydrogen, hydroxyl, and alkoxy. The alkoxy substituent is selected from the class consisting of methoxy, ethoxy and propoxy.

The organosilanes of the present invention, where X is chlorine, bromine, or hydrogen, are formed by a four

2 step reaction employing a dihalobenzene as the starting material. These reactions are represented by the following equations:

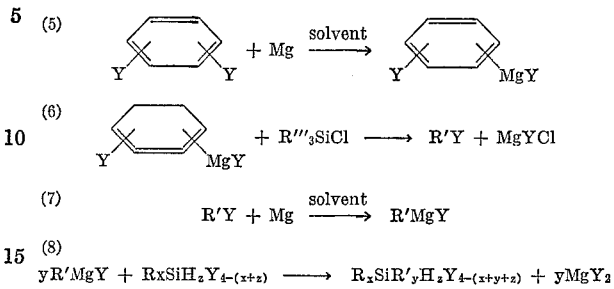

(8)
$$yR'MgY + RxSiH_2Y_{4-(x+z)} \longrightarrow R_xSiR'_yH_zY_{4-(x+y+z)} + yMgY_2$$

In the above equations, R, R', $x$, and $y$ are as previously defined; R''' is a lower alkyl group selected from the class consisting of methyl, ethyl, and propyl with each R''' being so selected as to conform to the trialkylsilylphenyl configurations of Formulas 2, 3 and 4; Y is a halogen atom selected from the class consisting of chlorine and bromine; $z$ is between 0 and 1, the sum of $x$ and $z$ is from 0 to 2, and the sum of $x$, $y$ and $z$ is from 1 to 3.

With respect to the first Grignard reagent as described in Equation 5, the dihalobenzene is preferably chlorobromobenzene when either the ortho- or meta-trialkylsilylphenyl compounds are to be formed. This preference is due to the faster reaction which occurs between the bromine attached to the benzene nucleus as compared with the chlorine reaction. When forming the para compound, either dichloro-, chlorobromo-, or dibromobenzene can be employed, the dichlorobenzene being preferable because of its lower cost. The Grignard reaction is carried out in the standard way, starting by placing the magnesium in an ether solvent. The amount of magnesium should range from one-half of the stoichiometric equivalent of the dihalobenzene to be added, up to a 25 percent excess of this amount, and preferably is employed in about a 10 percent excess. The dihalobenzene is then added slowly to the ether-magnesium mixture over a period of from 1 to 8 hours. Preferably, a Grignard initiator, such as ethyl bromide, is aded in minor amounts to the reaction. Following addition of the dihalobenzene, stirring is continued for about 1 to 4 hours in order to assure completion of the reaction. The temperature of the reaction can range from about room temperature to the reflux point of the mixture. When dichlorobenzene is employed, rather than the chlorobromobenzene, tetrahydrofuran can be employed in place of the diethyl ether solvent. The fiinal concentration of the Grignard product in the solvent should range from about 0.5 to 3 moles per liter. Following the stirring period to assure completion reaction, the solution is employed, as is, in the formation of the halophenyltrialkylsilane according to Equation 6.

The trialkylchlorosilane shown in Equation 6 is added to the solution just described over a period of about 1 to 4 hours. The reaction is exothermic and the reaction mixture may be gradually heated from ambient temperature to its reflux point. While the reaction is instantaneous, the reaction mixture is preferably stirred for about 15 minutes up to several hours in order to assure completion of the reaction. The trialkylchlorosilane is generally employed in an excess of up to about 20 percent because of the relative cost of the reagents and the greater assurance of complete reaction of the Grignard reagent with the excess chlorosilane present. While solvents still remain from the original Grignard reaction, additional ether or an aromatic hydrocarbon can be added to the Grignard mixture, prior to adding the silane, or to the silane prior to addition, if desired. The halophenyltrialkylsilane must be recovered from the reaction mixture before proceeding with the second Grignard reaction described in Equation 7. This recovery is accomplished by adding water to the reaction mixture of Equation 6 in order to dissolve the magnesium salts and to convert any excess trialkylchlorosilane to the corresponding hexaalkyldisiloxane. The amount of water is in large excess, preferably as much as 10 times, on a molar basis, the amount of the trialkylchlorosilane added, with essentially no upper limit except for the practicality of recovering the final product. An ether layer and a water layer are formed by this hydrolysis and the water layer is separated from the ether layer and discarded. The remaining ether layer is washed several additional times with excess water in order to remove any remaining magnesium salts. This ether layer is then dried with a standard inorganic drying agent such as sodium sulfate, calcium sulfate, etc., and the solution is filtered to remove the drying agent. Following filtration, the washed and dried ether layer is flash evaporated to remove the ether, and the residue fractionally distilled to recover the halophenyltrialkylsilane.

The method of conducting the second Grignard reaction, according to Equation 7, is the standard method described for the Grignard reaction of Equation 5. The halophenyltrialkylsilane is added to the magnesium-solvent mixture over a period from about 15 minutes to 1 hour and is then allowed to react for an additional 3 or more hours, at reflux, to assure completion of the reaction. The magnesium is removed from the reaction mixture by pouring the mixture through a filtration medium, such as glass wool, with the filtrate entering a vessel which is suitable for dispensing that filtrate in the production of the final organosilane according to Equation 8.

In the reaction described in Equation 8, the Grignard reagent and the halosilane are reacted in stoichometric ratios, depending on the number of halogen substituents to be replaced with trialkylsilylphenyl substituents. Up to a 10 percent excess of either of the reactants can be present. The reaction is generally carried out in tetrahydrofuran, but can be conducted in any solvent which is inert to the reactants under the conditions of reaction. For example, diethyl ether or hydrocarbon solvents can be employed. Since only a portion of the halide substituents are to be reacted, it is essential that the reaction be carried out in a dilute solution. Thus, the concentration of the final product should be in the range of 0.1 to 0.5 mole per liter. For the same reason, the Grignard reagent of the halophenyltrialkylsilane should be added to the solvent solution containing the halosilane, and the addition should be conducted over a period of about 0.5 to 6 hours. This reaction is exothermic and is generally conducted at about the reflux temperature of the reaction mixture. Refluxing should be continued for a period of at least about 2 hours following completion of the addition. The magnesium salt which results from this reaction is soluble in the tetrahydrofuran, and toluene is employed to extract the resulting halosilane having the trialkylsilylphenyl substituents. It is important that the magnesium salts be removed or they may cause redistribution of the halosilanes. Following the refluxing to complete reaction, therefore, the solution is filtered, the tetrahydrofuran is distilled from the filtrate, and the residue is extracted with toluene or other hydrocarbon solvent. This solution is then filtered, the hydrocarbon evaporated, and the residue fractionally distilled to recover the desired product of Equation 1.

In order to produce the hydroxyl-, or dihydroxyl-substituted organosilane of Formula 1, the corresponding chloro- or dichlorosilane is subjected to a neutral hydrolysis in the presence of a material such as sodium carbonate, sodium bicarbonate, or aniline. Only a very small amount of water is employed, so as to preclude the possibility of converting the material to a polymer. For the same reason, an excess of the acid neutralizer or acceptor is employed to quickly deactivate the by-product acid in order to preclude catalysis to a polymer.

The alkoxy-substituted organosilane is formed by treating the corresponding chloro- or bromoorganosilane with the alcohol corresponding to the alkoxy group, and removing the generated acid.

The following examples are given for the purpose of illustration and should not be considered as limiting in any way the full scope of the invention as covered in the appended claims. All parts in these examples are by weight.

Example 1

This example illustrates the preparation of m-chlorophenyltrimethylsilane according to Equations 5 and 6. A quantity of 146 parts of magnesium turnings was suspended in 140 parts of diethyl ether placed in a reaction vessel equipped with a mechanical stirrer, condenser, and dropping funnel. A solution was formed containing 1149 parts of m-bromochlorobenzene in 1400 parts of diethyl ether and this solution was placed in the dropping funnel attached to the reaction vessel. A small quantity of this solution was added to the magnesium suspension, together with about 3 parts of ethyl bromide, in order to initiate the reaction. The remainder of the dihalobenzene solution was added slowly over a period of about 7.5 hours. The heat generated by the exothermic reaction caused the reaction mixture to reflux gently during the course of the addition. Following the addition, the reaction mixture was stirred for about 4 hours at room temperature.

A quantity of 650 parts of trimethylchlorosilane was then added to the reaction mixture over a period of about 1 hour. Only a small amount of heat was evolved during this addition. External heat was supplied and the reaction mixture was refluxed for several hours. Following reflux, a quantity of 1000 parts of water was added to the reaction mixture, slowly, with vigorous stirring; a large quantity of heat was evolved during this addition. An ethereal layer was formed due to the water addition, and this ethereal layer was separated, washed four times with water, dried over sodium sulfate, filtered to remove the sodium sulfate, and the ether evaporated. The residue from the evaporation was placed in a distillation vessel and was fractionated in a Todd column at atmospheric pressure. A quantity of 671.5 parts of m-chlorophenyltrimethylsilane was obtained, boiling in the temperature range of 210–212° C. This amounted to a yield of 60 percent, based on the theoretical, of a material having the formula:

(9) 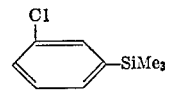

In other similar runs, yields from 50 to 65 percent were obtained.

Example 2

This example illustrates the preparation of bis(m-trimethylsilylphenyl)dichlorosilane from the m-chlorophenyltrimethylsilane prepared according to Example 1. In a manner similar to that employed in Example 1 for forming the Grignard reagent of the m-bromochlorobenzene, a quantity of m-trimethylsilylphenyl magnesium chloride was prepared by reacting 580 parts of the m-chlorophenyltrimethylsilane prepared in Example 1 with 80 parts of magnesium turnings, suspended in 1685 parts of tetrahydrofuran. The reaction mixture was filtered through glass wool into an addition vessel, the filtration being to remove the excess magnesium turnings. A quantity of 605 parts of the Grignard reagent, a 92 percent yield based on the theoretical, was recovered. The addition vessel was connected to a reaction vessel which was also fitted with a stirrer, condenser, and heating mantle. Into the reaction vessel was placed a solution containing 270 parts of silicon tetrachloride in 1775 parts of tetrahydrofuran. The amount of silicon tetrachloride was in a 10 percent molar excess, based on the stoichiometric requirement for forming the bis(m-trimethylsilylphenyl)dichlorosilane. The Grignard reagent was added to the silicon tetrachloride solution over a period of about 5 hours, while maintaining the reaction mixture at its reflux temperature. Following addition, the reaction mixture was stirred for an additional 8 hours at reflux and the water-soluble solids which formed were removed by filtration. The tetrahydrofuran was evaporated from the filtrate and the residue was extracted with hexane and filtered to remove additional solids. The hexane was then removed from the filtrate by distillation and the residue subjected to a fractional distillation. A quantity of 316 parts of a liquid boiling at 173–174° C. at 4 mm. was recovered from the fractional distillation. This product showed a hydrolyzable chlorine content of 17.98 percent as compared with the theoretical hydrolyzable chlorine content of 17.83 percent for the compound having the formula:

(10)
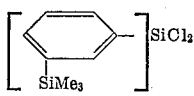

This product corresponds to Formula 1 where $x$ is 2, $y$ is 0, R is as described in Formula 2 where the trimethylsilyl group is in the meta position, and X is chlorine. The yield of 316 parts is a 55 percent yield, based on the theoretical, from the Grignard reagent employed.

Example 3

This example illustrates the preparation of bis(p-trimethylsilylphenyl)dichlorosilane. The procedures, conditions, and ratios of amounts employed were similar to those used in Examples 1 and 2. A quantity of 307 parts of p-trimethylsilylphenyl magnesium chloride was treated with 148 parts of silicon tetrachloride to give 195 parts of the bis(p-trimethylsilylphenyl)dichlorosilane, a 67 percent yield, based on the theoretical for the Grignard reagent. The product was analyzed for hydrolyzable chlorine content and showed 17.68 percent, corresponding favorably with the theoretical value of 17.83 percent for the compound of the formula:

(11)

The product had a boiling point of 190–191° C. at 2 mm., and solidified on standing. Its melting point was found to be 56.5–59° C.

Example 4

This example illustrates the preparation of bis(m-trimethylsilylphenyl)chlorosilane. The m-chlorophenyltrimethylsilane was prepared as in Example 1. A quantity of 650 parts of the corresponding Grignard reagent in 1865 parts of tetrahydrofuran was prepared as described in Example 2 and placed in the dispensing vessel. A solution was prepared containing 230 parts of trichlorosilane dissolved in 1775 parts of tetrahydrofuran and this solution was placed in the reaction vessel as described in Example 2. The Grignard reagent solution was added to the trichlorosilane solution over a period of about 3 hours, with vigorous stirring. Heat was evolved due to the exothermic reaction and kept the mixture near the reflux temperature during the addition. The reaction mixture was stirred an additional 3.5 hours following completion of the addition and the solids which formed were then filtered off. The tetrahydrofuran was evaporated from the filtrate, the residue extracted with hexane and this solution filtered to remove an additional amount of solids. The hexane was evaporated from the filtrate and the residue was fractionally distilled in a vacuum. A quantity of 322 parts of product boiling at 173–175° C. at 3 mm. was obtained. This product was analyzed for hydrolyzable chlorine and was found to contain 9.68 percent, corresponding favorably with the theoretical value of 9.77 percent for the compound of the formula:

(12)
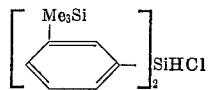

This product corresponds with the product of Formula 1 where $x$ is 2, $y$ is 0, R is as shown in Formula 2 with the trimethylsilyl group in the meta position, one X is chlorine and the other X is hydrogen.

Example 5

In a manner similar to that described in Example 1, o-trimethylsilylphenyltrichlorosilane, having the formula:

(13)
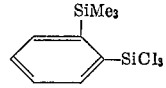

is formed. This corresponds to Formula 1 where $x$ is 1, $y$ is 0, R is as shown in Formula 2 where the trimethylsilyl group is in the ortho position, and X is chlorine.

Example 6

In a manner similar to that described in Example 1, (m-trimethylsilylphenyl)phenyldichlorosilane, of formula:

(14)
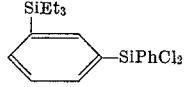

where Et is ethyl and Ph is phenyl, is formed. This product corresponds to Formula 1 where $x$ is 1, $y$ is 1, R is as shown in Formula 4 where R″ is ethyl, R′ is phenyl, and X is chlorine.

Example 7

In a manner similar to that shown in Example 1, tris (p-tripropylsilylphenyl)bromosilane having the formula:

(15)

where Pr is propyl, is formed. This corresponds to the material of Formula 1 where $x$ is 3, $y$ is 0, R is as shown in Formula 3 where R″ is propyl, and X is bromine.

Example 8

In a manner similar to that shown in Example 1, (m-trimethylsilylphenyl)ditolylchlorosilane having the formula:

(16)
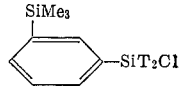

is formed, where T is the tolyl radical. This corresponds to the material of Formula 1 where $x$ is 1, $y$ is 2, R is as shown in Formula 2 where the trimethylsilyl group is in the meta position, R′ is tolyl, and X is chlorine.

Example 9

The material of Formula 16 is dissolved in a large quantity of ether and to it are added a quantity of sodium bicarbonate, in stoichiometric excess, and a small amount of water. This mixture is stirred and filtered to remove the salts. The ether is then distilled from the mixture resulting in a residue of a material having the formula:

(17)
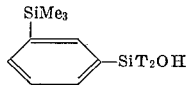

where T is as previously defined. This corresponds to Formula 1 where $x$ is 1, $y$ is 2, R is as shown in Formula 2 where the trimethylsilyl group is in the meta position, R′ is the tolyl radical, and X is the hydroxy radical.

Example 10

A quantity of the material of Formula 10 is placed in a reaction vessel and is heated to a temperature of about 40° C., while maintaining a vacuum of about 50 mm. Over the course of about 1 hour a stoichiometric excess of methanol is added, with stirring. While maintaining the temperature and vacuum, stirring is continued for about 2 hours following completion of the addition. The resulting product is found to have the formula:

(18) 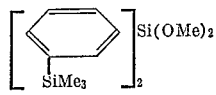

This corresponds with the material of Formula 1 where $x$ is 2, $y$ is 0, R is as shown in Formula 2 with the trimethylsilyl group in the meta position, and X is methoxy.

Thus, a method for forming organosilanes substituted with a trialkylsilylphenyl substituent has been shown. The first two steps of the method have been found strikingly superior to a method described by Benkeser and Krysiak in the Journal of the American Chemical Society, vol. 76, page 599 (1954). That method involved the treatment of dibromobenzene with n-butyllithium and treating the resulting lithiated bromobenzene with trimethylchlorosilane to form trimethylsilylphenyl bromide. Employing that procedure a poor quality product and a low yield were obtained. In addition to the starting material, dibromobenzene, the by-product, bis(trimethylsilylbenzene) is formed and both have boiling points very close to that of the desired end product, making separation extremely difficult. Employing that method, yields of 17 percent were reported, rather than the 50 to 65 percent obtained employing the procedure described according to the present invention for formation of the halophenyltrialkylsilane.

In addition to the method for forming the organosilane, a wide variety of such silanes having the trialkylsilylphenyl substituent have been shown. These silanes are extremely valuable in the formation of cyclotrisiloxanes substituted with the trialkylsilylphenyl group, as described in my copending application Ser. No. 595,631 and longer chain polymers substituted with the same group as described and claimed in my copending application Ser. No. 595,632, now U.S. Patent 3,385,821, both filed of even date herewith and assigned to the same assignee as the present invention. The polymers having the trimethylsilylphenyl substituents, as described in the aforementioned application, are tough and leathery, but not rubber-like. The thermal stability of these materials is extremely high, and essentially equivalent to that of polytetrafluoroethylene, in contradistinction to other organopolysiloxanes.

What I claim as new and desire to secure as Letters Patent of the United States is:

1. An organosilane of the formula:

$$R_xSiR'_yX_{4-(x+y)}$$

where R is a trialkylsilylphenyl substituent having a formula selected from the class consisting of:

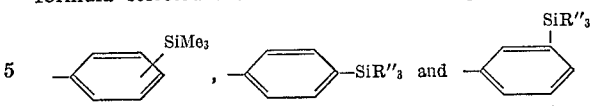

where Me is methyl, R" is a lower alkyl radical selected from the class consisting of methyl, ethyl, and propyl, and no more than two R" substituents on any given radical are methyl; R' is an aryl radical, X is a reactive substituent selected from the class consisting of chlorine, bromine, hydrogen, alkoxy, and hydroxyl, $x$ is from 1 to 3, $y$ is from 0 to 2, and the sum of $x$ and $y$ is from 1 to 3.

2. The organosilane of claim 1 having the formula:

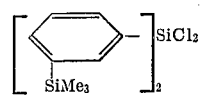

where Me is methyl.

3. The organosilane of claim 1 having the formula:

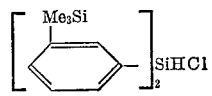

where Me is methyl.

4. The organosilane of claim 1 having the formula:

where Me is methyl.

5. A method of forming the organosilane of claim 1 comprising treating a dihalobenzene with magnesium so as to form a first Grignard reagent, reacting said first Grignard reagent with a trialkylchlorosilane and recovering the reaction product, treating said reaction product with magnesium so as to form a second Grignard reagent, and reacting said second Grignard reagent with an organodihalosilane.

References Cited

UNITED STATES PATENTS

| | | | |
|---|---|---|---|
| 2,557,782 | 6/1951 | Clark | 260—448.2 |
| 2,628,242 | 2/1953 | Clark | 60—448.2 |
| 2,739,638 | 3/1956 | Lewis et al. | 260—448.2 X |
| 3,053,872 | 9/1962 | Omietanski | 260—448.2 |
| 3,385,821 | 5/1968 | Wu | 260—448.2 X |

HELEN M. McCARTHY, *Primary Examiner.*

PAUL F. SHAVER, *Assistant Examiner.*

U.S. Cl. X.R.

260—448.8, 46.5